United States Patent [19]

Twerdochlib

[11] Patent Number: 5,031,459
[45] Date of Patent: Jul. 16, 1991

[54] TURBINE GENERATOR SHAFT TORSION MONITOR

[75] Inventor: Michael Twerdochlib, Oviedo, Fla.

[73] Assignee: Westinghouse Electric Corp., Pittsburgh, Pa.

[21] Appl. No.: 349,029

[22] Filed: May 8, 1989

[51] Int. Cl.$^5$ .............................................. G01H 1/10
[52] U.S. Cl. ................................... 73/650; 73/862.34; 73/660
[58] Field of Search ............ 73/660, 659, 650, 862.33, 73/862.32, 862.36, 462, 593, 862.34; 340/682; 364/494

[56] References Cited

U.S. PATENT DOCUMENTS

| | | | |
|---|---|---|---|
| 3,686,956 | 8/1972 | Simpkin et al. | 73/660 |
| 4,148,222 | 4/1979 | Wolfinger | 73/650 |
| 4,213,346 | 7/1980 | Polovnikov et al. | 73/660 |
| 4,347,571 | 8/1982 | Leung et al. | 73/650 |
| 4,423,635 | 1/1984 | Senicourt et al. | 73/660 |
| 4,444,063 | 4/1984 | Snowden et al. | 73/862.34 |
| 4,627,297 | 12/1986 | Akimoto | 73/862.34 |
| 4,887,468 | 12/1989 | McKendree et al. | 73/660 |
| 4,934,192 | 6/1990 | Jenkins | 73/660 |

Primary Examiner—Hezron E. Williams
Assistant Examiner—Rose M. Finley
Attorney, Agent, or Firm—K. Bach

[57] ABSTRACT

A shaft torsion monitor comprises a plurality of sensors for sensing the angular position of various portions of the shaft under dynamic conditions and for producing sets of data representative of the sensed angular positions. A memory is provided for periodically storing one of the sets of data representative of the angular position of the various portions of the shaft in the absence of torsion. Circuitry is provided for subtracting the stored set of data from each of the other sets of data to eliminate the effects of noise. The resulting data is analyzed to determine the torsion experienced by the shaft.

8 Claims, 3 Drawing Sheets

TURBINE GENERATOR SHAFT TORSION MONITOR

BACKGROUND OF THE INVENTION

1. Field of the Invention

The present invention is directed generally to monitoring the operating parameters in a steam turbine generator and, more specifically, to the monitoring of turbine generator shaft torsion.

2. Description of the Prior Art

In many applications it is desirable to measure the torsion experienced by a rotating shaft. That is particularly true when the rotating shaft is employed within a turbine generator. Such shafts are extremely expensive and need to be closely monitored for purposes of scheduling maintenance. It is also desirable to determine what effect a shaft torsional event has had on a turbine generator shaft. Shaft torsional events must be closely monitored to determine whether the shaft is approaching the end of its useful life. Failure to properly predict when a shaft has reached the end of its useful life or when a shaft needs servicing could lead to a catastrophic failure resulting in millions of dollars worth of damage and the loss of life if any personnel happen to be near the turbine generator during such a catastrophic failure.

Conventional torsion monitors employ magnetic sensors that detect the passage of teeth of a toothed wheel located at a selected position on the shaft. The phase shift of a signal produced by the toothed wheel with respect to a once per revolution signal provides an indication that is an accurate measure of the integrated twist of the shaft between the point carrying the toothed wheel and the point generating the once per revolution signal.

To identify various shaft modes, more toothed wheel locations are required. That represents a problem in that the shaft rotates at very high speeds and, because of those high speeds, it is difficult to provide the shaft with the necessary indicia so that signals representative of the shaft's angular position can be produced. Additional problems are encountered because many areas of the shaft are simply not accessible. Thus, the need exists for a turbine generator shaft torsion monitor which can be used in conjunction with conventional turbine generator shafts without requiring substantial modifications.

SUMMARY OF THE INVENTION

The present invention is directed to a system for monitoring shaft torsion comprised of a plurality of sensors for sensing the angular position of various portions of the shaft under dynamic conditions and for producing sets of data representative of the sensed positions. Memory is provided for storing one of the sets of data representative of the angular position of the various portions of the shaft in the absence of a torsional event. Means are provided for subtracting the stored set of data from each of the other sets of data to eliminate the effects of noise. Circuitry, responsive to the means for subtracting, analyses the result to determine the torsion experienced by the shaft.

According to one embodiment of the invention, the invention is used to monitor the torsion experienced by the shaft of a turbine generator. A plurality of sensors are responsive to two toothed wheels, a turning gear, and rows of unshrouded low pressure turbine blades which are all carried by the shaft. The subtraction of one set of data from the remaining sets is primarily carried out in conjunction with the data produced by the sensors responsive to the rows of unshrouded turbine blades.

According to another embodiment of the present invention, the shaft torsion monitor additionally comprises a recorder, responsive to the circuitry for analyzing, for storing sets of data generated before and after a torsional event.

The present invention is also directed to a method of monitoring shaft torsion comprising the steps of: sensing the angular position of various portions of the shaft under dynamic conditions; producing sets of data representative of the sensed angular positions; periodically storing one of the sets of data representative of the angular position of the various portions of the shaft in the absence of a torsional event; subtracting the stored set of data from each of the other sets of data to eliminate the effects of noise; and analyzing the result to determine the torsion experienced by the shaft.

The apparatus and method of the present invention advantageously use the conventional construction of a turbine generator shaft to produce a maximum number of data points in a cost effective manner. Information related to the angular position of various portions of the shaft is derived by sensing blade tips. Problems associated with sensing blade tips such as the imprecise positioning of the blade tips, the variable magnetic character of the blade tips, the variable spacing between blade tips and magnetic sensors, missing blade tips, and the vibration of the blade tips about an equilibrium position are compensated for by the present invention. The present invention thus provides a cost effective yet reliable torsion monitor which can be used in conjunction with conventional turbine generator shafts with minimal modifications. Those and other advantages and benefits of the present invention will become apparent from the Description of a Preferred Embodiment hereinbelow.

BRIEF DESCRIPTION OF THE DRAWINGS

In order that the present invention may be clearly understood and readily practiced, a preferred embodiment will now be described, by way of example only, with reference to the accompanying figures wherein.

DESCRIPTION OF A PREFERRED EMBODIMENT

Figure 1:
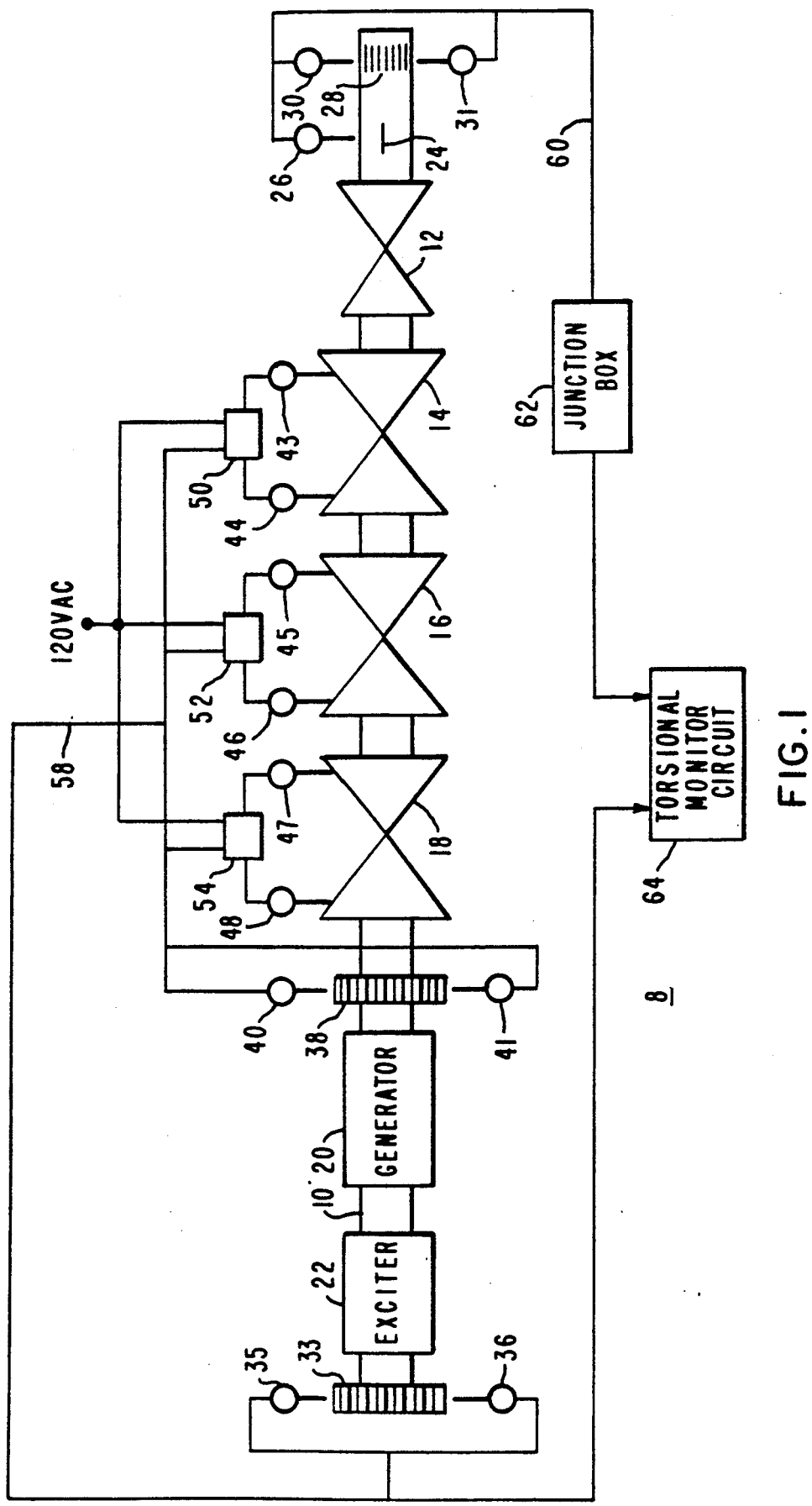
FIG. 1 is a block diagram illustrating the torsion monitor of the present invention in conjunction with a turbine generator shaft and the various equipment carried by the shaft.

FIG. 1 illustrates a torsion monitor 8 in conjunction with a turbine generator shaft 10 carrying a high pressure turbine 12, three low pressure turbines 14, 16, and 18, a generator 20, and an exciter 22 as is known. Shaft 10 carries indicia 24 which cooperates with a sensor 26 to produce a once per revolution signal as is known.

Because of the high speeds at which the turbine generator shaft 10 rotates and the limited access to the shaft 10, the number of points at which measurements can be taken is limited. As a practical matter, the accuracy of the mathematical model of the shaft 10 determines the number of data points needed. As the accuracy of the model increases, the number of data points required to accurately predict the torsion experienced at any point along the shaft decreases. Thus, a trade-off needs to be made between the time and money spent on developing an accurate mathematical model of the shaft 10 and a reasonable number of data points which can be conveniently accessed for use in conjunction with the model.

To provide the signals necessary for proper operation of the present invention, a first free end of the shaft 10 may have a plurality of teeth 28 formed therein. That plurality of teeth cooperates with a pair of sensors 30 and 31 to produce signals representative of the angular position of that portion of the shaft 10. The other free end of the shaft 10 may carry a toothed wheel 33 which cooperates with sensors 35 and 36 to produce signals representative of the angular position of that end of the shaft. Turbine generator shafts are provided with a turning gear 38 between the generator 20 and the low pressure turbine 18 for slowly rotating the shaft 10 in overheated conditions. The turning gear 38 cooperates with sensors 40 and 41 to provide signals representative of the angular position of that portion of the shaft 10.

In addition to the previously indicated data points, six other data points are provided in the disclosed embodiment of the invention. Those data points are produced by two sensors 43 and 44 used in conjunction with two of the low pressure unshrouded turbine blade rows (not shown) in the low pressure turbine 14, two sensors 45 and 46 used in conjunction with two of the low pressure unshrouded turbine blade rows (not shown) in the low pressure turbine 16, and two sensors 47 and 48 used in conjunction with two of the low pressure unshrouded turbine blade rows (not shown) of the low pressure turbine 18. Thus, the disclosed embodiment provides nine data points representative of the angular position of nine portions of the shaft. Those of ordinary skill in the art will recognize that other data points may be selected. Additionally, more or less data points may be provided. The data points selected for the disclosed embodiment were selected as a matter of convenience. That is, the plurality of teeth 28 and tooth wheeled 33 are provided on the free ends of the shaft 10 which are accessible. The turning gear 38, which is already provided on the shaft, is used to provide another data point. The six turbine blade rows which are monitored may already be monitored if, for example, a turbine blade vibration monitor of the type disclosed and claimed in U.S. Pat. No. 4,887,468, which is hereby incorporated by reference, has been installed. Thus, positioning of the sensors needed to produce the signals for the present invention can be achieved with minimal modification of existing equipment.

The sensors 26, 30, 31, 35, 36, 40, and 41 may be of a type known as magnetic reluctance probes such as those available from Air Pax Corp. Other types of probes, such as Bently Nevada probes, could also be used. The sensors 43-48 may be magnetic reluctance or Bently Nevada sensors mounted on flex probes.

The signals produced by sensors 26, 30, and 31 are conducted by a cable 60 through a junction box 62 to a torsional monitor circuit 64. The signals produced by the sensors 43 and 44 are input to a preamplifier 50 which is connected to a source of 120 volts AC. The sensors 45, 46, 47, and 48 are similarly connected to preamplifiers 52 and 54, respectively. The preamplifiers 50, 52, and 54 are connected through appropriate cables 58 to the torsional monitor circuit 64. The signals produced by the sensors 40 and 41 are also input to the torsional monitor circuit 64 through cables 58. Finally, sensors 35 and 36 are connected to the torsional monitor circuit 64 through the cable 58.

Torsional measurements using toothed wheels such as 28 and 33 are well understood by those of ordinary skill in the art and need not be described further herein. However, shaft torsion measurement based on data produced by monitoring low pressure turbine blade rows poses problems not experienced with tooth wheels. Such problems are caused by (i) the imprecise positioning of the blade tips, (ii) the variable magnetic character of the blade tips, (iii) the variable spacing between the blade tips and magnetic sensor, (iv) missing blade tips, and (v) the vibration of the blade tips about an equilibrium position.

As more fully described hereinbelow, the present invention eliminates the aforementioned problems and permits simultaneous real-time monitoring of shaft torsional amplitude at multiple points along the shaft from the previously described combination of sensed blade rows and toothed wheels. The present invention also includes the automatic recording of torsion data from those multiple shaft sites upon detection of a shaft torsional event. Approximately eight seconds of data before and sixteen seconds of data after the torsional event are recorded. An important requirement which the present invention satisfies is that data is simultaneously collected from all locations along the shaft so that future lengthy analyses of that data can be performed to determine shaft torsional modes, maximum shaft stress, and consumption of shaft life. The present invention can also be implemented using existing circuitry.

Figure 2:
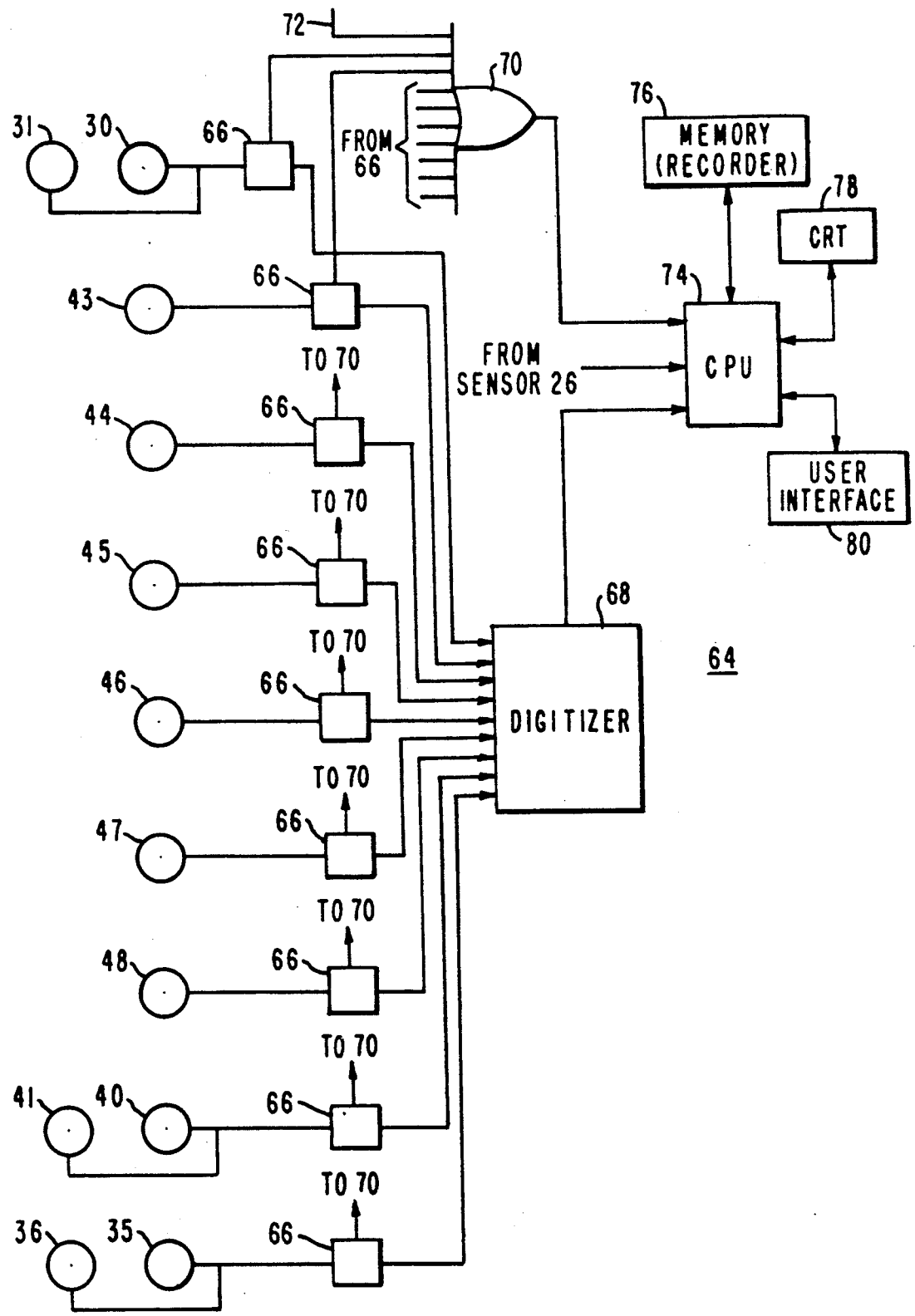
FIG. 2 is a block diagram illustrating a circuit for processing the signals produced by certain of the sensors illustrated in FIG. 1.
Figure 3A:
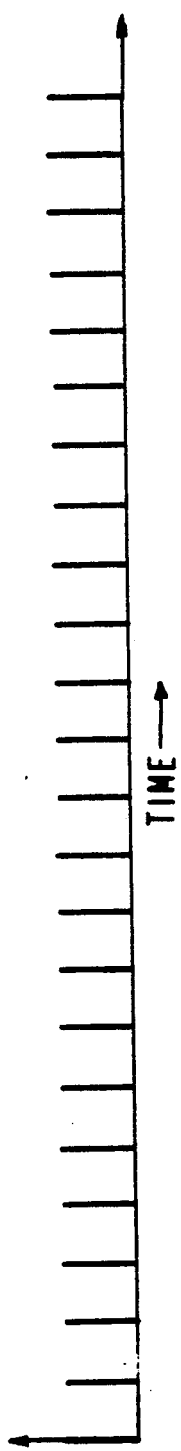
FIGS. 3A and 3B illustrate a signal produced by one of the sensors of FIG. 1 under no load and load conditions, respectively.
Figure 3B:
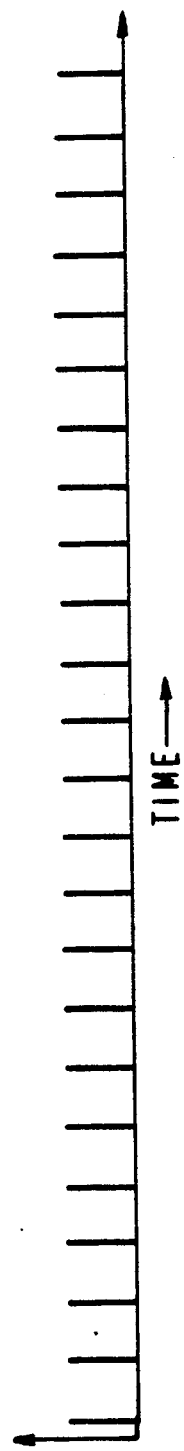

The torsional monitor circuit 64 is shown in detail in FIG. 2. Typically, the sensors detect a blade or tooth passing event and produce a sinusoidal-like signal in response to those events. It is the phase relationship between those signals that contains the angular displacement of the shaft induced by the torque transmitted along the shaft. For simplicity, only the zero crossings of such a sinusoidal signal from, for example, blade tip sensor 43 need be considered because the zero crossings contain the positional information. A graph of the zero crossings of that sinusoidal-like signal versus time for a blade row having perfectly positioned blades possessing none of the aberrations (i)-(iv) identified above and having no vibration, (v) identified above, is illustrated in FIGS. 3A and 3B for no load and load conditions, respectively. The phase shift induced by the torque transmitted by the shaft is clearly apparent from the phase shift between the signals illustrated in FIGS. 3A and 3B, which can be compared to the once per revolution signal produced by the sensor 26.

Figure 4A:
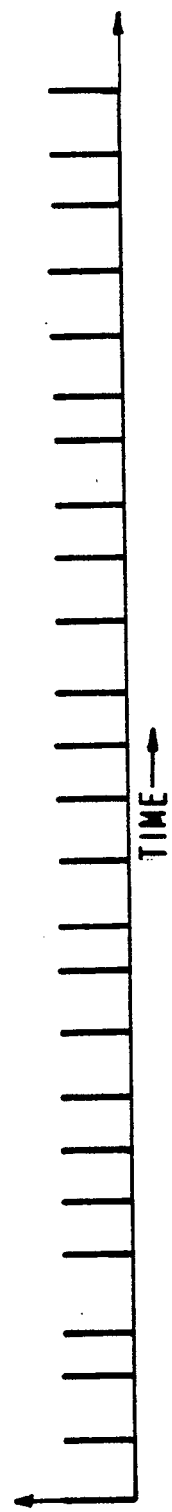
FIGS. 4A and 4B illustrate signals produced by one of the sensors of FIG. 1 resulting from blade aberrations under no load and load conditions, respectively.
Figure 4B:
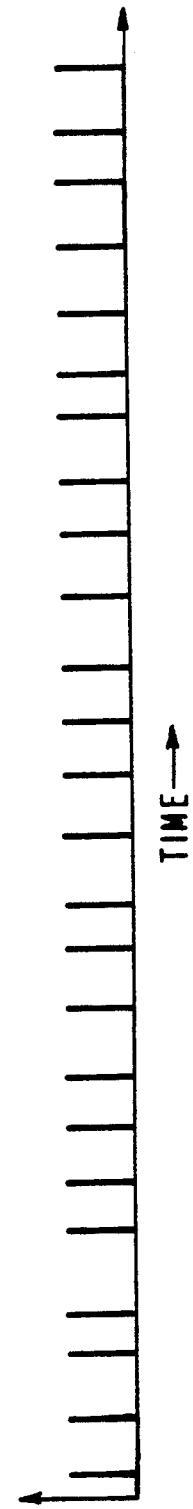

The effect of abberrations (i)-(iv) is to cause a constant perturbation in the signal pattern as shown in exaggerated fashion in FIGS. 4A and 4B. That pattern causes errors in torque measurement. Such errors do not occur when the torque measurement is made on a toothed wheel or gear since the teeth are precisely positioned. Thus, one of the advantages of the present invention is the elimination of errors introduced in torque measurements when the data is produced by monitoring turbine blade rows thereby allowing the turbine blade rows to function as data gathering points.

Returning to FIG. 2, sensor pairs 30 and 31, 40 and 41, and 35 and 36 are each connected in parallel to reduce tooth placement errors although the present invention would work using a single sensor at each position. Each of those sensor pairs and each of the sensors 43-48 feeds a Westinghouse phase modulator circuit 66. The phase modulator circuits 66 contain a frequency-to-voltage converter (not shown) which produces a voltage proportional to the frequency of the input signal, followed by an integrating circuit (not shown) that produces an output signal representative of the angular displacement of that portion of the shaft. The output signals produced by all of the phase modulator circuits 66 are input to a digitizer 68. The digitizer 68 may be a DAS-20 board manufactured by Metrabyte. Such a board can digitize the signals output from the phase modulators 66 at 100,000 samples per second using a sequential technique that allows a single DAS-20 board to read all phase modulators 66 with data samples from adjacent phase modulators 66 being ten microseconds apart. The digitized data may be transferred to an extended memory (not shown) within a central processing unit (CPU) 74 using direct memory access (DMA) where twenty-four seconds of data is preserved in an over write of oldest data.

Each of the phase demodulators 66 also contains a comparator (not shown) which is responsive to the integrating circuit for producing an alarm output signal input to an OR gate 70. When one of the phase demodulators 66 produces an alarm output signal, or if an external trigger signal is available on a line 72, a signal is input to the CPU 74. That signal is indicative of a shaft torsional event or, in the case of the external trigger signal, the user's desire to record additional data. In either case, sixteen seconds of data, in addition to the normal eight seconds of data, is recorded in a memory device or recorder 76. Some type of display device such as a cathode ray tube 78 and user interface such as a keyboard 80 complete the description of the circuit 64 illustrated in FIG. 2. The user will recognize that many other schemes for handling the data produced by the sensors may be provided such as a fully digital system.

After the data has been digitized by the digitizer 68, it is stored by the CPU 74. Thus, discrete sets of data are produced with each set of data representative of the angular positions of the various portions of the shaft sensed by the sensors at a given time. If there are no AC components, i.e., variations in signals produced by the sensors resembling those of FIG. 4B, then it can be assumed that no torsional event is occurring. The signals produced by the sensors 43-48 under such conditions establish a base line for each blade row which base line may be stored by the CPU 74. The data stored for each blade row which is representative of the base line for that row may be subtracted from all subsequent signals for that row. That substraction effectively removes all contributions resulting from aberrations (i)—(iv) identified above, i.e. noise. By removing that noise, the resulting signal produces, after a Fourier Transform or a Fast Fourier Transform (which can be performed by the CPU 74), a more meaningful final spectrum from which shaft torsion may be accurately calculated. Because of thermal and other dynamic changes occurring in the turbine generator, it is desirable to periodically update the base line data. That data may be updated, for example, every ten minutes.

The blades are tuned so that they do not vibrate at synchronism. However, synchronous vibration will be eliminated by the subtraction described above.

Another advantage of the present invention addresses the problem caused by nonsynchronous vibration of the blades, (v) identified above. A sensor positioned above a blade row produces about 5,400 pulses per second. Only ten sampling points per revolution (170 points per second) are required to span the frequency range of interest in shaft torsional analysis. That means that the signal corrected by the subtraction previously mentioned can be filtered and/or averaged by CPU 74 to remove higher frequency non-synchronous signal variations due to blade vibration without compromising the information of interest. The Fourier Transform that is eventually performed on such a signal will further reduce any noise at particular frequencies of interest because any remaining noise, to a certain degree, is spread over the entire frequency band.

In addition to the advantages previously mentioned, the use of phase demodulator circuits 66 for each sensor provides the opportunity to measure data in response to a shaft torsional event sensed by any of the sensors by virtue of the alarm output signals produced by the comparators within the phase demodulators 66. The use of existing phase demodulator circuits together with a sequential digitizer board allows the simultaneous reading and recording of all monitored shaft positions by a single CPU. That results in a very significant reduction in development and unit production costs.

The output signals of the phase demodulators 66 may be sampled at a minimum of ten samples per revolution whereas one hundred zero crossing times per revolution must be processed in conventional digital windowing techniques. The technique of the present invention greatly reduces data processing and storage requirements. The torsion monitor 8 can be expanded to monitor more shaft sites with minimal hardware change, i.e. an additional sensor and phase demodulator 66 per added site.

The present invention is also directed to a method of monitoring shaft torsion comprising the steps of: sensing the angular position of various portions of the shaft under dynamic conditions; producing sets of data representative of the sensed angular positions; storing one of the sets of data representative of the angular position of the various portions of the shaft in the absence of a torsional event; subtracting the stored set of data from each of the other sets of data to eliminate the effects of noise; and analyzing the result to determine the torsion experienced by the shaft.

While the present invention has been described in conjunction with a preferred embodiment thereof, those of ordinary skill in the art will recognize that many modifications and variations are possible. This disclosure and the following claims are intended to cover all such modifications and variations.

What is claimed is:

1. A system for monitoring the torsion experienced by a rotatable shaft, comprising:
    means for sensing an angular position of various portions of the shaft under dynamic conditions in the presence and in the absence of torsion, and for producing sets of date representative of said sensed positions;
    means for periodically selecting and storing one of said sets of data representative of an angular position of the various portions of the shaft in the absence of torsion;

means for subtracting said stored set of data from each of the nonselected sets of data to eliminate the effects of noise; and means, responsive to said means for subtracting, for determining the torsion experienced by the shaft.

2. The system of claim 1 wherein the shaft includes a turbine generator shaft carrying rows of unshrouded low pressure turbine blades, and wherein said means for sensing includes a plurality of sensors responsive to the rows of unshrouded low pressure turbine blades.

3. The system of claim 2 wherein the shaft carries toothed wheels and a turning gear, said system additionally comprising second means for sensing, responsive to the toothed wheels and the turning gear, for sensing the angular position of various portions of the shaft under dynamic conditions and for producing sets of data representative of said sensed positions, said means for determining being additionally responsive to said second means for sensing.

4. The system of claim 1 additionally comprising circuit means, responsive to said means for sensing, for determining the occurrence of a shaft torsional event, the system of claim 1 additionally comprising means for recording said sets of data, said means for recording being responsive to said circuit means.

5. A shaft torsion monitor for monitoring the torsion experienced by a rotatable turbine generator shaft of the type carrying rows of unshrouded low pressure turbine blades on particular portions of the shaft, said monitor comprising:

indicia carried by various portions of the shaft;

first means, responsive to said indicia, for sensing an angular position of the various portions of the shaft carrying said indicia under dynamic conditions and for producing data representative of said sensed positions;

second means, responsive to the rows of unshrouded low pressure turbine blades, for sensing an angular position of the particular portions of the shaft carrying the blades under dynamic conditions in the presence and in the absence of torsion, and for producing data representative of said sensed positions;

means, responsive to said second means for sensing, for selecting and storing data representative of an angular position of the particular portions of the shaft in the absence of torsion;

means for subtracting said stored data from the nonselected data produced by said second means for sensing to eliminate the effects of noise; and means, responsive to said means for subtracting and said first means for sensing, for determining the torsion experienced by the shaft.

6. The torsion monitor of claim 5 additionally comprising means for filtering said data produced by said second means for sensing to eliminate the effects of vibration.

7. The torsion monitor of claim 5 additionally comprising means for averaging said data produced by said second means for sensing to eliminate the effects of vibration.

8. A method of monitoring the torsion experienced by a rotating shaft, comprising the steps of:

sensing an angular position of various portions of the shaft under dynamic conditions in the presence and in the absence of torsion;

producing sets of data representative of said sensed angular positions;

periodically selecting and storing one of said sets of data representative of an angular position of the various portions of the shaft in the absence of a torsional event;

subtracting said stored set of data from each of the nonselected sets of data to eliminate the effects of noise; and analyzing the result to determine the torsion experienced by the shaft.

* * * * *